United States Patent
Drew et al.

(10) Patent No.: US 9,615,507 B2
(45) Date of Patent: Apr. 11, 2017

(54) ENERGY HARVESTING WIRELESS SENSOR NETWORK

(71) Applicant: HUSQVARNA AB, Huskvarna (SE)

(72) Inventors: Bernard Drew, Savannah, GA (US); Matthew Albinger, Shelby, NC (US)

(73) Assignee: HUSQVARNA AB, Huskvarna (SE)

( * ) Notice: Subject to any disclaimer, the term of this patent is extended or adjusted under 35 U.S.C. 154(b) by 24 days.

(21) Appl. No.: 14/771,889

(22) PCT Filed: Mar. 5, 2014

(86) PCT No.: PCT/EP2014/054289
§ 371 (c)(1),
(2) Date: Sep. 1, 2015

(87) PCT Pub. No.: WO2014/135603
PCT Pub. Date: Sep. 12, 2014

(65) Prior Publication Data
US 2016/0007525 A1     Jan. 14, 2016

Related U.S. Application Data

(60) Provisional application No. 61/772,649, filed on Mar. 5, 2013.

(51) Int. Cl.
*A01D 34/64*     (2006.01)
*A01D 34/00*     (2006.01)
(Continued)

(52) U.S. Cl.
CPC ........... *A01D 34/006* (2013.01); *A01D 34/64* (2013.01); *A01D 34/68* (2013.01); *B60R 16/0307* (2013.01)

(58) Field of Classification Search
CPC .... A01D 34/006; A01D 34/008; A01D 34/82; A01D 34/64; A01D 34/68;
(Continued)

(56) References Cited

U.S. PATENT DOCUMENTS

| 6,609,357 | B1 * | 8/2003 | Davis | A01D 34/006 |
| | | | | 56/10.2 A |
| 6,856,035 | B2 * | 2/2005 | Brandon | B60L 11/1807 |
| | | | | 180/65.245 |

(Continued)

FOREIGN PATENT DOCUMENTS

| EP | 2105337 A1 | 9/2009 |
| GB | 2411233 A | 8/2005 |
| WO | 2010093234 A2 | 8/2010 |

OTHER PUBLICATIONS

International Search Report and Written Opinion in the international patent application No. PCT/EP2014/054289 mailed Jun. 27, 2014.
(Continued)

*Primary Examiner* — Robert Pezzuto
(74) *Attorney, Agent, or Firm* — Nelson Mullins Riley & Scarborough LLP (57) ABSTRACT

A lawn care device (10) may include a mobility assembly (42,44) configured to facilitate movement of the lawn care device over ground, a cutting deck (40) housing at least one blade, an engine (50) operably coupled to the at least one blade via a rotatable shaft to enable the at least one blade to cut vegetation responsive to rotation of the at least one blade, a control unit (110) configured to be in communication with at least one functional unit of the lawn care device, at least one sensor (142) disposed to monitor the at least one functional unit, a transmitter (144) operably coupled to the sensor to wirelessly transmit a signal from the sensor to the control unit based on operation of the at least one functional unit, and an energy harvester (146) configured to convert energy from a source of origin into electrical energy, the electrical energy being employed for powering the at least one sensor and the transmitter.

20 Claims, 5 Drawing Sheets

(51) Int. Cl.
*A01D 34/68* (2006.01)
*B60R 16/03* (2006.01)

(58) Field of Classification Search
CPC ........ A01D 69/02; A01D 75/18; A01D 75/20;
A01D 2101/00; B60Q 9/001; B60L
11/1822; B60L 11/1877; B60L 2200/20;
B60R 16/0307
USPC .... 56/10.2 A–10.2 E, 10.2 R, 11.9; 320/114,
320/115, 137; 701/50, 25, 22, 36, 48, 68
See application file for complete search history.

(56) References Cited

U.S. PATENT DOCUMENTS

| | | | |
|---|---|---|---|
| 7,812,473 B2 * | 10/2010 | Larsen | A01D 34/82 |
| | | | 123/198 D |
| 9,083,195 B2 * | 7/2015 | Lewis | H02J 7/0068 |
| 2003/0144774 A1 * | 7/2003 | Trissel | A01D 34/008 |
| | | | 701/23 |
| 2006/0021312 A1 | 2/2006 | Brandon et al. | |

OTHER PUBLICATIONS

International Preliminary Report on Patentability in the international patent application No. PCT/EP2014/054289 issued Sep. 8, 2015.

* cited by examiner

ENERGY HARVESTING WIRELESS SENSOR NETWORK

TECHNICAL FIELD

Example embodiments generally relate to outdoor power equipment and, more particularly, some embodiments relate to outdoor power equipment employing a network of sensors that are configured to harvest energy and communicate wirelessly.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

Although lawn mowing devices and other outdoor power equipment can sometimes be made to be fairly simple in their design, it is possible to make longer lasting, safer, and better performing devices by monitoring and/or optimizing certain parameters. To monitor such parameters, a sensor network may be employed. A typical sensor network includes a plurality of sensors that are distributed throughout the device to monitor specific conditions, status information, or parametric data. Some sensors may be connected to corresponding switches that may operate to provide certain protective or performance enhancing functions. The sensors and switches receive power and communicate with each other via a wiring harness. The wiring harness creates a network by providing wired connection between all components for which networking is desired.

The use of a wiring harness provides additional cost associated with running wires throughout the device. The wiring harness can also create design challenges since each sensor and switch must be connected, so a route for wired connection must be considered by engineers. This can be a challenge for some remotely located sensors. Additionally, each sensor and switch combination has power requirements. Accordingly, the sensors can provide additional battery drain that may limit the life and performance capabilities of certain battery powered equipment.

BRIEF SUMMARY OF SOME EXAMPLES

Some example embodiments may provide a wireless communication network of sensors. Moreover, the sensors may be powered locally by energy harvesting power sources that are disposed proximate to the respective sensors. The sensors may therefore be distributed wherever needed without needing to run wires for power or communication purposes since power can be provided locally, without draining a common battery. Moreover, design may be simplified since management of wiring runs will not be an issue, and less material cost may be provided. Additionally, since the communication range needed to send wireless messages within the context of a single device is relatively small, low power wireless communication that does not interfere with other wireless devices may be accomplished in some examples without using licensed spectrum.

In an example embodiment, a lawn care device is provided. The lawn care device may include a mobility assembly configured to facilitate movement of the lawn care device over ground, a cutting deck housing at least one blade, an engine operably coupled to the at least one blade via a rotatable shaft to enable the at least one blade to cut vegetation responsive to rotation of the at least one blade, a control unit configured to be in communication with at least one functional unit of the lawn care device, at least one sensor disposed to monitor the at least one functional unit, a transmitter operably coupled to the sensor to wirelessly transmit a signal from the sensor to the control unit based on operation of the at least one functional unit, and an energy harvester configured to convert energy from a source of origin into electrical energy, the electrical energy being employed for powering the at least one sensor and the transmitter.

In another example embodiment, a method of utilizing opportunistic energy harvesting on a lawn care device is provided. The lawn care device may include a transmitter, a sensor, a control unit, a functional unit, and an energy harvester, and the transmitter may be operably coupled to the sensor to wirelessly transmit a signal from the sensor to the control unit based on operation of the functional unit. Further, the method may include: (a) converting, by the energy harvester, energy from a source of origin into electrical energy; (b) powering, by the energy harvester, the sensor and the transmitter via the electrical energy converted by the energy harvester; (c) monitoring, by the sensor, parametric data or state change status to determine whether a state change or data generation has occurred; and (d) wirelessly transmitting, by the transmitter, a signal indicative of the state change or the generated data based on whether a state change or data generation has occurred.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf, or sod care. As used herein, operable coupling should be understood to relate to direct or indirect connection that, in either case, enables functional interconnection of components that are operably coupled to each other.

As discussed above, the provision of power and communication capabilities for sensors using wired connections can create engineering and cost challenges. Some embodiments described herein will provide sensors that have no need for wired connection. The sensors may therefore receive power locally via energy harvesting devices, and may communicate wirelessly within a sensor network.

Figure 1A:
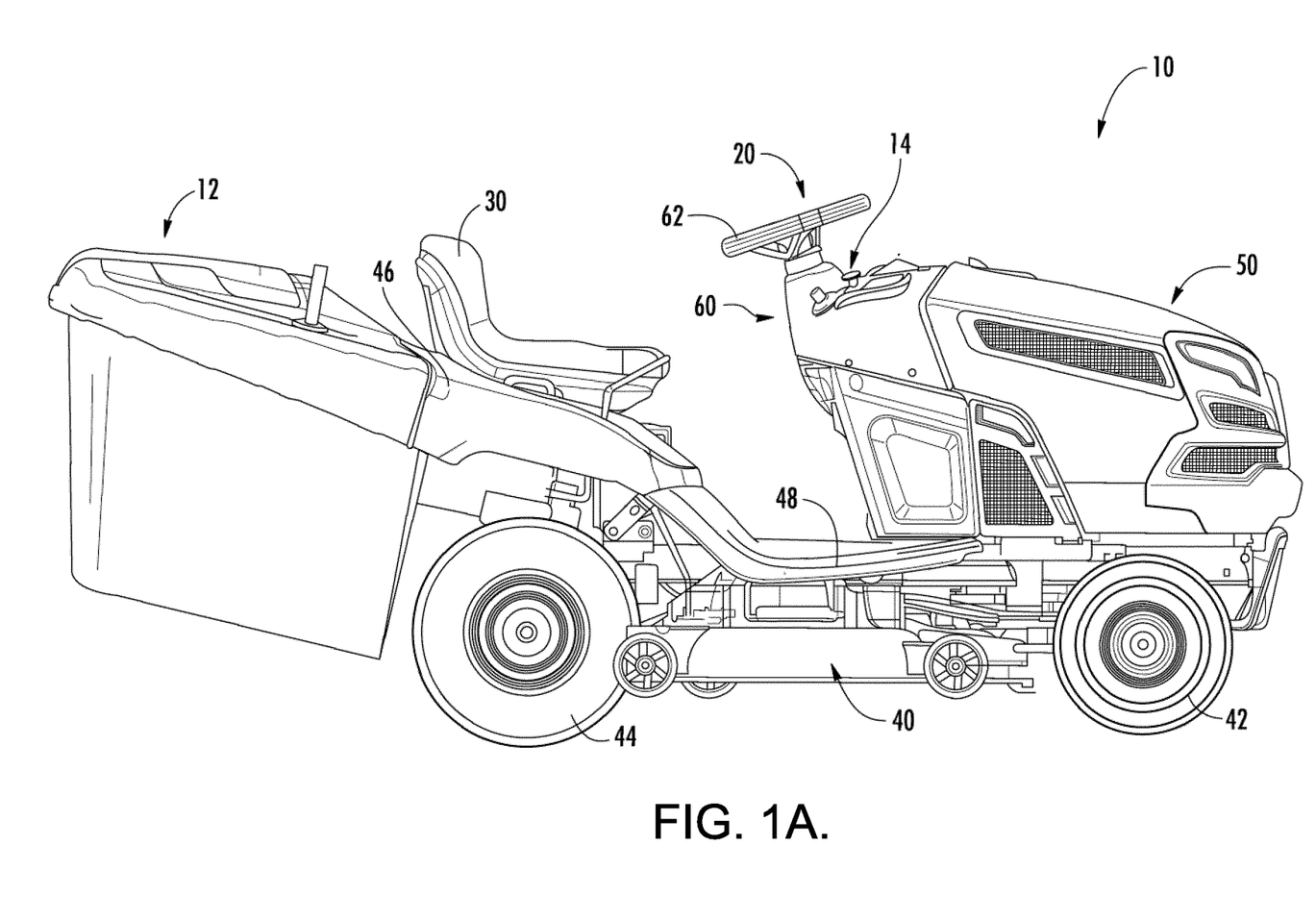
FIG. 1A illustrates a side view of a riding lawn care vehicle according to an example embodiment.
Figure 1B:
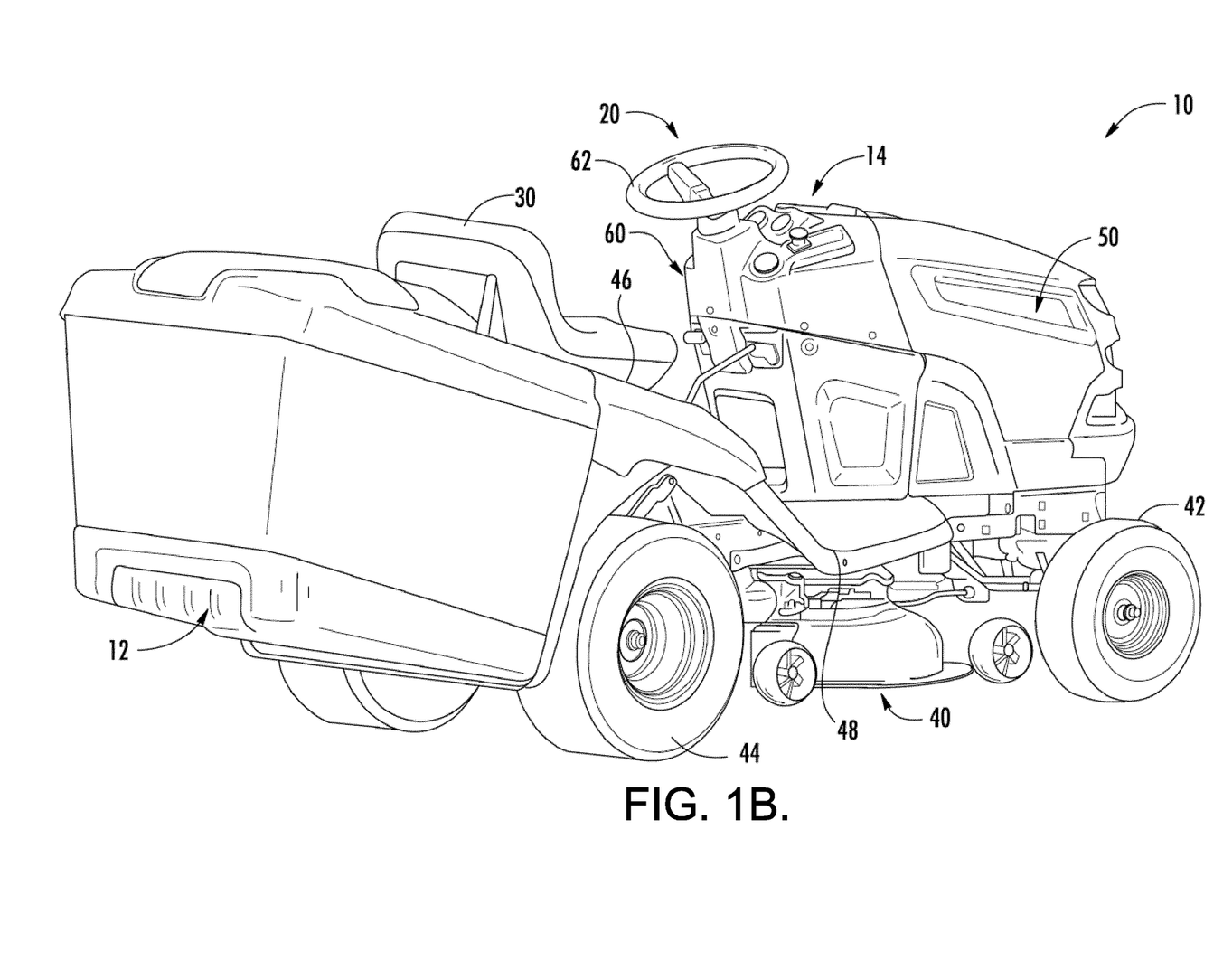
FIG. 1B illustrates a perspective view of the riding lawn care vehicle according to an example embodiment.

FIG. 1, which includes FIGS. 1A and 1B, illustrates an example of a riding lawn care vehicle 10 having a bagging attachment 12. However, it should be appreciated that example embodiments may be employed on numerous other riding lawn care vehicles that may not include a bagging attachment 12. The riding lawn care vehicle 10 may also include an information panel 14 displaying operational information regarding the riding lawn care vehicle 10. As shown and described herein, the riding lawn care vehicle 10 may be a riding lawn mower (e.g., a lawn tractor, front-mount riding lawn mower, zero-turn riding lawn mower, cross mower, stand-on riding lawn mower, and/or the like). However, other example embodiments may be employed on other lawn mowers, such as robotic mowers, walk behind lawn mowers, remote-controlled lawn mowers, and/or the like.

FIG. 1A illustrates a side view of the riding lawn care vehicle 10 and FIG. 1B illustrates a perspective view of the riding lawn care vehicle 10. The riding lawn care vehicle 10 may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear, or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the riding lawn care vehicle frame to permit easier access to the underside of the riding lawn care vehicle 10 without requiring removal of the cutting deck 40. The cutting deck 40 may have one, two, three, or more cutting blades driven by one, two, three, or more rotatable shafts. The shafts may be rotated by any number of mechanisms. For example, in some embodiments, the shafts are coupled to a motor via a system of belts and pulleys. In other embodiments the shafts may be coupled to the motor via a system of universal joints, gears, and/or other shafts. In still other embodiments, such as in an electric lawn mower, the shaft may extend directly from an electric motor positioned over the cutting deck.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge. It should also be appreciated that the front wheels 42 and rear wheels 44 of this example embodiment form a mobility assembly for moving the riding lawn care vehicle 10 over the ground. However, other mobility assemblies may alternatively be employed such as, for example, a continuous track.

The riding lawn care vehicle 10 may also include additional control related components such as one or more speed controllers, cutting height adjusters, and/or the like. Some of the controllers, such as the speed controllers, may be provided in the form of foot pedals that may sit proximate to a footrest 48 (which may include a portion on both sides of the riding lawn care vehicle 10) to enable the operator to rest his or her feet thereon while seated in the seat 30.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine 50 may also provide power to turn the cutting blade or blades disposed within the cutting deck 40. In this regard, for example, the engine 50 may be used to turn a shaft upon which the cutting blade or blades may be fixed (e.g., via a belt and pulley system and/or other mechanisms). The turning of the shaft, at high speeds, may move the cutting blade or blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blade and mower are configured for mulching.

In some embodiments, the information panel 14 may include or be a portion of a user interface, which may provide information generated by a control unit of the riding lawn care vehicle 10. The control unit may provide control of one or more components of the riding lawn care vehicle 10. In some cases, the control unit may provide control on the basis of state information, parametric data, and/or other operational information that may be provided to the control unit at least in part via sensors disposed to monitor various components of the riding lawn care vehicle 10. In an example embodiment, a communication network may be formed for handling communications to and from the control unit.

Figure 2:
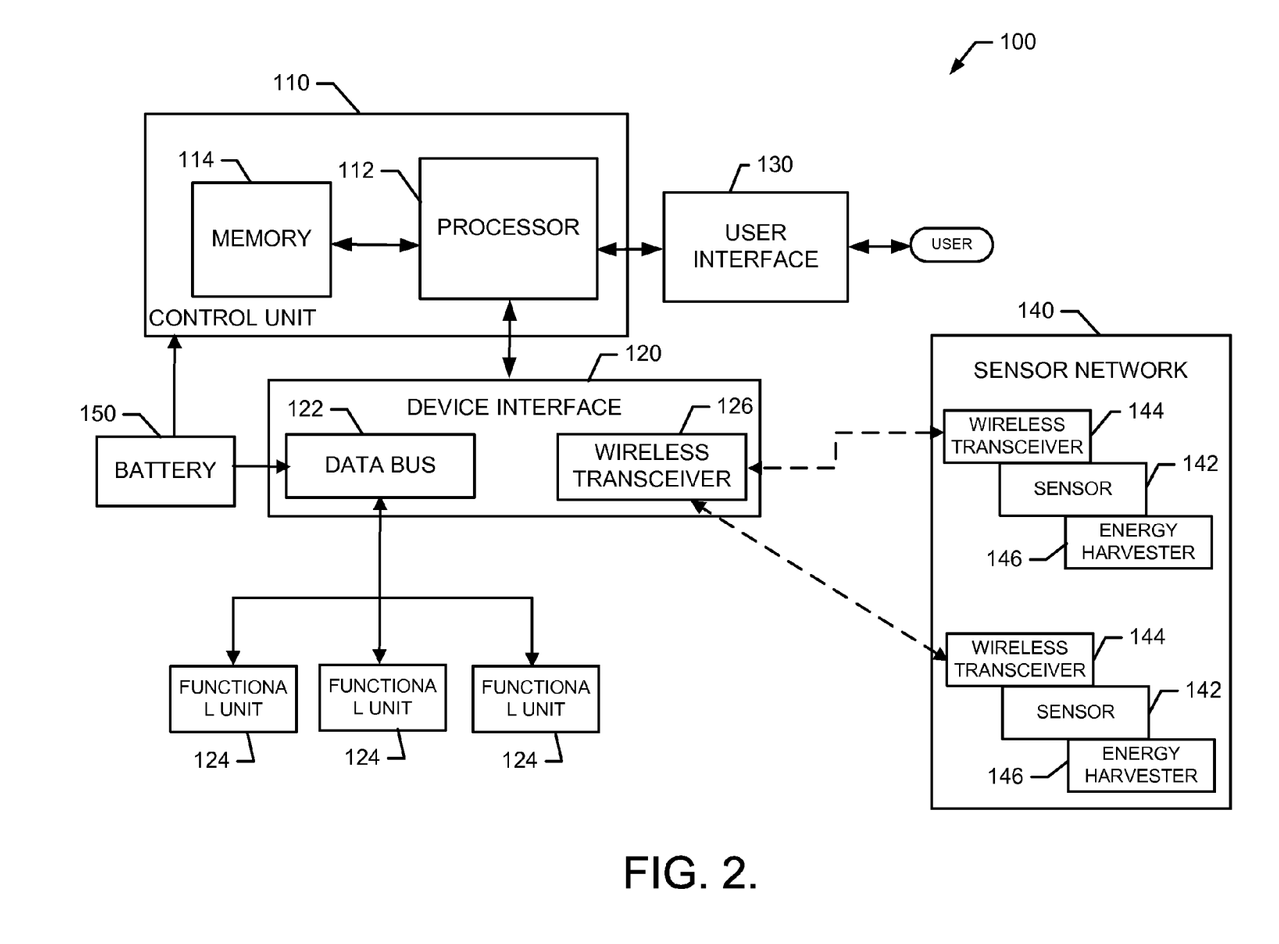
FIG. 2 illustrates a block schematic diagram of an electrical system of a riding lawn care vehicle according to an example embodiment.

FIG. 2 illustrates a block diagram of a communication network 100 according to an example embodiment. As shown in FIG. 2, the communications network 100 may include a control unit 110 of an example embodiment as described herein. In this regard, for example, the communication network 100 may utilize the control unit 110 to provide monitoring capability for various components and/or systems of the riding lawn care vehicle 10 and may also provide electronic control inputs to one or more functional units or components of onboard circuitry and/or monitoring circuitry to process data generated by the one or more functional units regarding various indications of device activity (e.g., operational parameters and/or status information) relating to a corresponding one of the functional units or components. In some cases, the control unit 110 may be configured to perform data processing, control function execution, and/or other processing and management services according to an example embodiment of the present invention. In some embodiments, the control unit 110 may be embodied as a chip or chip set. In other words, the control unit 110 may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The control unit 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the control unit 110 may include processing circuitry such as one or more instances of a processor 112 and memory 114 that may be in communication with or otherwise control a device interface 120 and, in some cases, a user interface 130. As such, the control unit 110 may be embodied as a circuit chip (e.g., an integrated circuit chip) configured (e.g., with hardware, software, or a combination of hardware and software) to perform operations described herein.

The user interface 130 may be in communication with the control unit 110 to receive an indication of a user input at the user interface 130 and/or to provide an audible, visual, tactile, or other output to the user. As such, the user interface 130 may include, for example, a display, one or more levers, switches, buttons or keys (e.g., function buttons), and/or other input/output mechanisms (e.g., at the information panel 14). In an example embodiment, the user interface 130 may include one or a plurality of lights, a display, a speaker, a tone generator, a vibration unit, and/or the like.

The device interface 120 may include one or more interface mechanisms for enabling communication with other devices (e.g., sensors of a sensor network 140 and/or other accessories or functional units of the communication network 100 or other power equipment on which an example embodiment may be employed). In some cases, the device interface 120 may be any means such as a device or circuitry embodied in either hardware, or a combination of hardware and software that is configured to receive and/or transmit data from/to sensors and functional units or components in communication with the control unit 110 via internal communication systems of the riding lawn care vehicle 10.

In some cases, the device interface 120 may include at least one data bus 122 for wired communication with one or more functional units 124 or components. The functional units 124 or components with which the control unit 110 may communicate via the data bus 122 of the device interface 120 may include headlights, electric clutch (including blade or drive clutches), ignition switches, display drivers, engine coil (or other engine shutdown mechanisms), fuel shutoff solenoid, and/or the like. In some embodiments, one or more sensors may also be connected to the data bus 122 (e.g., in addition to the sensors of the wireless sensor network 140 described herein).

In an example embodiment, the device interface 120 may further include a wireless transceiver 126 configured to conduct relatively short range wireless communications with components of the sensor network 140. The components of the sensor network 140 may each include a sensor 142 that is configured to monitor a particular parameter, status, or other information associated with operation of the riding lawn care vehicle 10, a wireless transceiver 144 configured to conduct wireless communications with the wireless transceiver 126 of the device interface 120, and an energy harvester 146. The energy harvester 146 may provide the small amount of power needed to power the sensor 142 and the wireless transceiver 144 by harvesting inherently present energy in an original form and converting it into electrical energy. The inherently present energy is typically wasted energy that is a byproduct of other processes occurring in association with operation of the riding lawn care vehicle 10. In some embodiments, a battery 150 of the communication network 100 may only be used to power the control unit 110 and corresponding devices and/or components that have wired connection therewith. Thus, the sensor network 140 may operate independent of the power of the battery 150 to avoid draining the power of the battery 150.

In an example embodiment, each wireless transceiver 144 may include wireless communication equipment (e.g., a one-way or two-way radio and corresponding antennas) for at least communicating information from the corresponding sensor 142 to the device interface 120 and, in the case of a two-way radio, in some cases receiving information from the control unit 110 via the wireless transceiver 126 of the device interface 120. Accordingly, it should be appreciated that the wireless transceiver 126 of the device interface 120 could be a receiver only and the wireless transceiver 144 of the sensor network 140 could be a transmitter only in embodiments in which one-way radio communication is employed. The wireless communication may be conducted via any suitable frequency and corresponding communication protocol. For example, Bluetooth communication, WiFi communication, or other short range communication systems could be employed in some cases. However, given the low power that is expected to be needed for local communications of not more than a few feet for most devices on which example embodiments are employed (e.g., the riding lawn care vehicle 10 or other walk behind mowers), unlicensed band communication may be useful for employment in some embodiments.

The processor 112 may be embodied in a number of different ways. For example, the processor 112 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of control unit 110) capable of performing operations according to embodiments of the present invention while configured accordingly. Thus, for example, when the processor 112 is embodied as an ASIC, FPGA, or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the control unit 110) may be embodied as, include, or otherwise control the operation of the communication network 100 based on inputs received by the control unit 110. As such, in some embodiments, the processor 112 (or the control unit 110) may be said to cause each of the operations described in connection with the communication network 100 in relation to operation the communication network 100 relative to undertaking the corresponding functionalities associated therewith responsive to execution of instructions or algorithms configuring the processor 112 (or control unit 110) accordingly.

In an exemplary embodiment, the memory 114 may include one or more non-transitory memory devices such as, for example, volatile and/or non-volatile memory that may be either fixed or removable. The memory 114 may be configured to store information, data, applications, instructions, or the like for enabling the control unit 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 140, the functional units 124, or other components. Among the contents of the memory 114, applications may be stored for execution by the processor 112 in order to carry out the functionality associated with each respective application. In some cases, the applications may include instructions for recognition of conditions that require a corresponding response, and instructions for execution of the response.

In some embodiments, the control unit 110 may receive data from electronic components and/or sensors of the sensor network 140 (e.g., sensors that measure variable values related to device operational parameters like RPM, temperature, oil pressure, seat presence, blade operation, brake status, reverse operation, and/or the like) via wireless communication. The control unit 110 may then process the data received and initiate some control over the functional units 124 at least in part on the basis of the data. Alternatively or additionally, the control unit 110 may direct the application of an alert or other indication to the user via the user interface 130.

The energy harvester 146 may be a power source that is enabled to generate power (and in some cases also store the power) based on conversion of energy between an originating energy type and electrical energy. In some cases, the energy to be converted may be in the form of kinetic energy (e.g., due to vibration or equipment rotation). However, it should also be appreciated that acoustic, mechanical, thermal, or other forms of energy could alternatively provide the energy source for conversion. Any suitable conversion technique may be employed. For example, a piezoelectric crystal may be employed to convert vibration or strain into electrical energy. Thermoelectric effect may be employed (e.g., using the Seebeck effect, the Peltier effect, and/or the Thomson effect) to convert heat into electrical energy. A microphone may be used to convert noise to electrical energy. Other devices converting RF energy, mechanical energy, or kinetic energy into electrical energy may also be employed. For example, microelectromechanical systems (MEMS) or even nanoelectromechanical systems (NEMS) may be employed to generate electrical energy from other forms of energy.

The electrical energy generated by an energy harvester 146 may be stored in some cases by charging a small local battery, or by charging a capacitor. In some cases, the energy harvester 146 may be enabled to generate relatively small amounts of power sufficient to power a simple safety switch or similar switch device (e.g., a Hall effect sensor) to illustrate a state change in a particular component. The energy harvester 146 may also generate and/or store sufficient energy to power transmission of as little as one bit from the wireless transceiver 144 to report a state change regarding the device, component, functional unit, or parameter that is being monitored by the sensor 142. However, it should also be appreciated that the energy harvester 146 may generate more power for some cases and the ability to store and therefore accumulate power (e.g., in a battery or capacitor) may enable periodic or irregular reporting of information to the control unit 110 using more than one bit. In this regard, for example, in some embodiments, enough bits may be transmitted to provide parametric data, device identification information, status information, and/or the like.

The wireless transceivers 126 and 144 may employ any desirable wireless communication protocol and frequencies/ communication channels. In some cases, the communications may be encrypted for security purposes. The communication protocol may include identification information for the component for which the corresponding information is applicable. In some cases, unique identifiers may be provided for various components or groups of components. Thus, for example, component identifiers, group identifiers, type identifiers, and/or the like may be employed alone or in combination with each other.

The data rate may be relatively low in some embodiments (e.g., less than one transmission every ¼ second). Thus, periodic communications with any desirable reporting period may be supported. Some or all sensors 142 may be configured to report at a given interval. Some groups of sensors may be assigned to report at corresponding different intervals. Intermittent and long dead time communications may also be supported. Thus, for example, no signal may be generated for a relatively long period of time until a specific stimulus is presented. In other cases, more routine, but still unpredictable, transmissions may be made whenever certain activities are performed. A protocol for ordering of transmission of some or all of the sensors 142 may be defined so that interference can be avoided, and/or so that the reporting components may be identified based on the timing of a report or the order in which their respective reports are received.

In some cases, reports may be required to be made at periodic intervals, even in the absence of any state change, so that the control unit 110 may ascertain that each sensor 142 is in working order and able to communicate. Thus, for example, if one sensor fails to check in at a required interval, the control unit 110 may determine that the corresponding sensor has a fault and provide an alert for the operator (e.g., via the user interface 130). In a two-way communication scenario, the control unit 110 may request that one sensor, a group, or all sensors check in at any desired time or interval. However, in a one-way communication scenario, the wireless transceiver 144 may only check in at pre-programmed intervals, or when an activity is detected that causes the sensor 142 to generate data or state change information for transmission.

Figure 3:
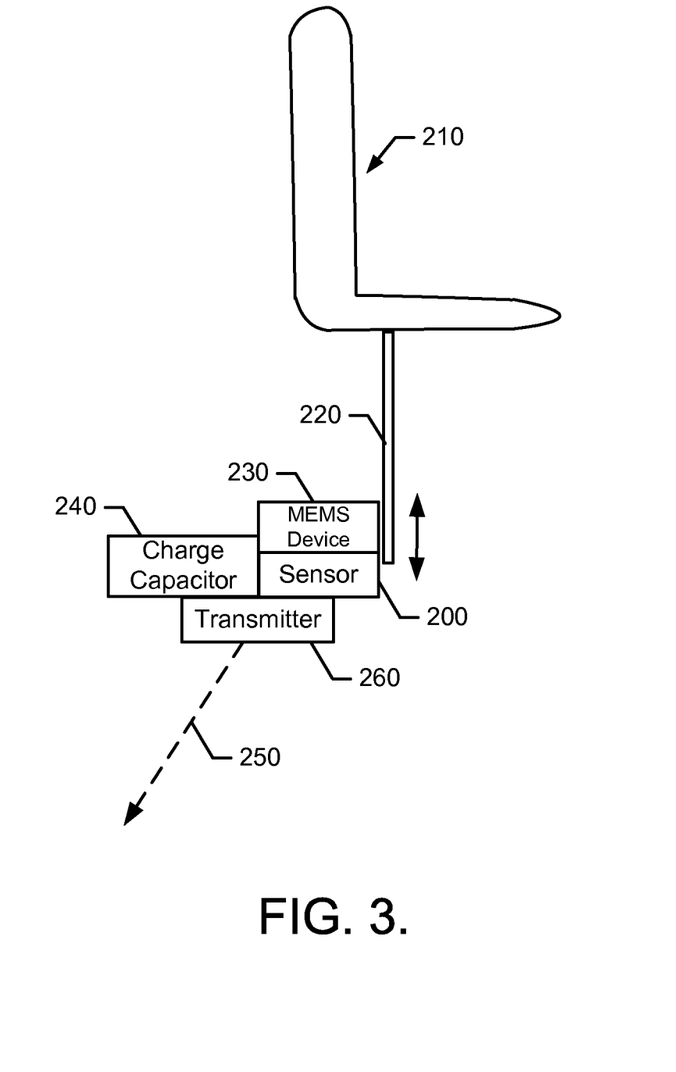
FIG. 3 illustrates a block diagram of one sensor according to an example embodiment.

FIG. 3 illustrates a block diagram of one sensor 200 according to an example embodiment. It should be appreciated that numerous such sensors may be disposed at various locations throughout the riding lawn care vehicle 10, and each such sensor may monitor a corresponding functional unit or component to determine state information or operational data associated with operation of the riding lawn care vehicle 10. Thus, the monitoring of seat presence as provided in connection with the description of FIG. 3 is merely one non-limiting example of a specific state that can be monitored by some embodiments. Moreover, although the sensor 200 of FIG. 3 is a safety switch, it should be appreciated that other safety switches, or even data gathering devices other than switches, may be employed in alternative example embodiments.

As shown in FIG. 3, the sensor 200 (which may be a Hall effect sensor) may monitor seat position. In this regard, when the operator sits in the seat 210, a stem 220 may move to generate a state change in the sensor 200. Likewise, when the operator leaves the seat 210, the sensor 200 may detect a state change. A MEMS device 230 may be provided to charge a capacitor 240 responsive to vibration or to the strain induced when the seat 210 carries or releases a load. In response to an operator leaving the seat 210, the sensor 200 may generate a signal 250 to indicate the state change. The signal 250 may be passed along to the control unit 110 wirelessly via transmitter 260. In some embodiments, filtration of the vibration information, or filtration of noise may be useful in determining RPM. Thus, for example, the MEMS device 230 of some embodiments may further include a filter for determining RPM.

Figure 4:
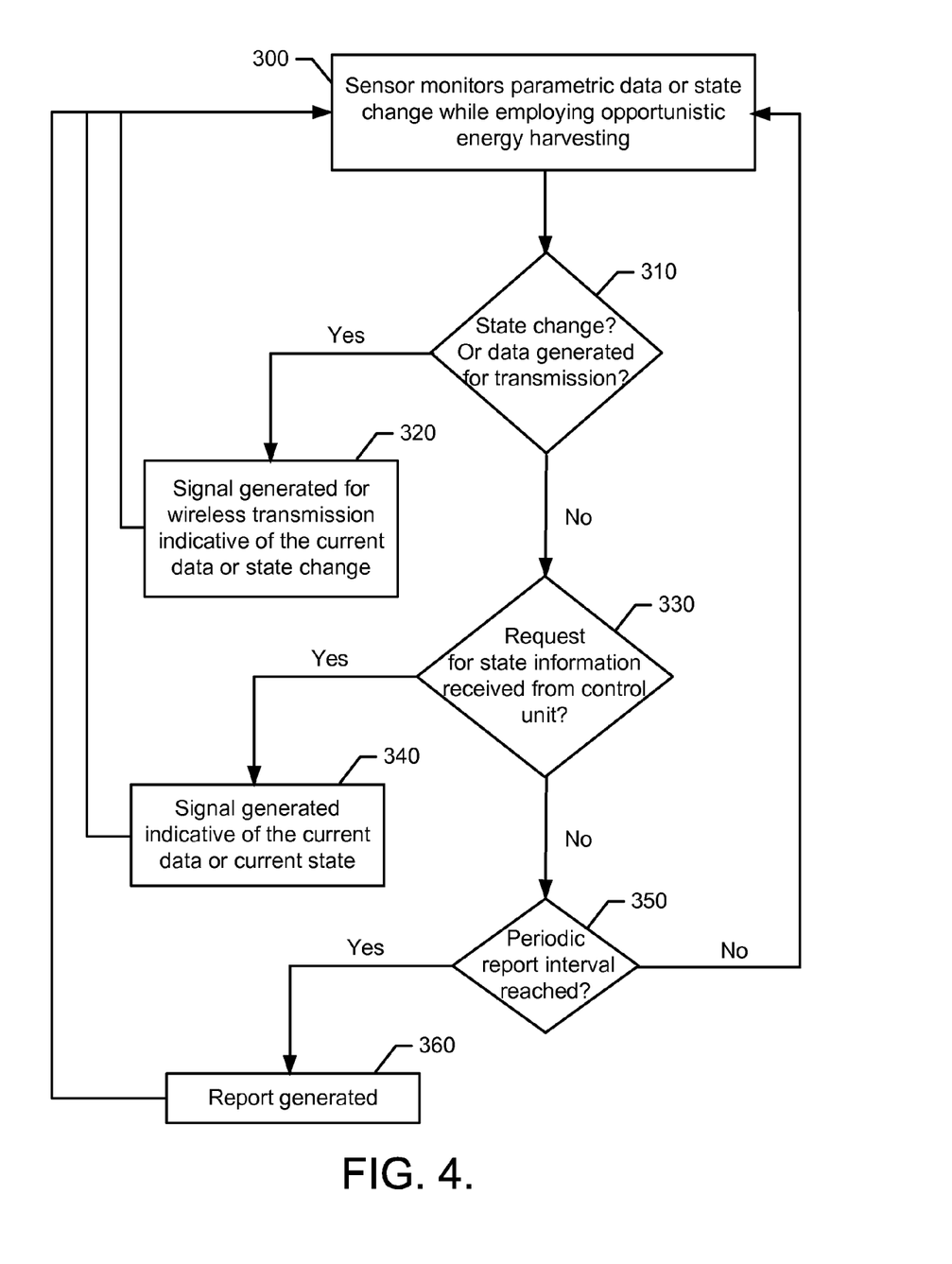
FIG. 4 illustrates an example communication sequence associated with one example embodiment.

FIG. 4 illustrates an example communication sequence associated with one example embodiment. As shown in FIG. 4, the sensor may monitor parametric data or state change while employing opportunistic energy harvesting at operation 300. At operation 310, a determination may be made as to whether data has been generated for transmission or whether a state change has occurred relative to a component being monitored by the sensor. If a state change has occurred or data is generated for transmission, the sensor may generate a signal for wireless transmission indicative of the current data or state change at operation 320. If no state change has occurred and no data for transmission has been generated, a determination may be made as to whether a request for state information is received from the control unit at operation 330. If a request is received, the sensor may generate a signal indicative of current state or current data at operation 340. If no request has been received, a determination may be made as to whether a periodic report interval has been reached at operation 350. If the interval is reached, a report may be generated at operation 360. If the report interval has not been reached, control flow may return to operation 300.

In an embodiment in which only one-way communication is possible, operations 330 and 340 may be omitted. In some embodiments in which a simple architecture and protocol for reporting is preferred, operations 350 and 360 may also be omitted. Moreover, still other communication paradigms may be defined in connection with the employment of alternative example embodiments.

Example embodiments may provide for a reduction in the load on the battery of a riding lawn care vehicle 10 (or other lawn mower) by removing at least some sensors from wiring harness connection with the battery. Some embodiments may also reduce design challenges associated with running wires to remote sensors and save space and cost. Eliminating cable runs to components, or groups of components, may also increase reliability in some cases.

Thus, some example embodiments provide a method of utilizing opportunistic energy harvesting on a lawn care device. In such embodiments, the lawn care device includes a transmitter, a sensor, a control unit, a functional unit, and an energy harvester, and the transmitter is operably coupled to the sensor to wirelessly transmit a signal from the sensor to the control unit based on operation of the functional unit. Further, in such embodiments, the method includes: (a) converting, by the energy harvester, energy from a source of origin into electrical energy; (b) powering, by the energy harvester, the sensor and the transmitter via the electrical energy converted by the energy harvester; (c) monitoring, by the sensor, parametric data or state change status to determine whether a state change or data generation has occurred; and (d) wirelessly transmitting, by the transmitter, a signal indicative of the state change or the generated data based on whether a state change or data generation has occurred.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

Of course, it should also be appreciated that the components described in connection with some figures herein may correspond to various components described in connection with other figures herein. For example, in some embodiments, the seat 210 shown in FIG. 3 corresponds to the seat 30 shown in FIG. 1, the sensor 200 shown in FIG. 3 corresponds to a sensor 142 shown in FIG. 2, and the transmitter 260 shown in FIG. 3 corresponds to a wireless transceiver 144 shown in FIG. 2. As another example, in some embodiments, the sensor described in connection with FIG. 4 corresponds to a sensor 142 described in connection with FIG. 2. Also, it will be understood that, where possible, any of the advantages, features, functions, devices, and/or operational aspects of any of the embodiments of the present invention described herein may be included in any of the other embodiments of the present invention described herein.

That which is claimed:

1. A lawn care device comprising:
   a mobility assembly configured to facilitate movement of the lawn care device over ground;
   a cutting deck housing at least one blade;
   an engine operably coupled to the at least one blade via a rotatable shaft to enable the at least one blade to cut vegetation responsive to rotation of the at least one blade;
   a control unit configured to be in communication with at least one functional unit of the lawn care device;
   at least one sensor disposed to monitor the at least one functional unit;
   a transmitter operably coupled to the sensor to wirelessly transmit a signal from the sensor to the control unit based on operation of the at least one functional unit; and
   an energy harvester configured to convert energy from a source of origin into electrical energy, the electrical energy being employed for powering the at least one sensor and the transmitter.

2. The lawn care device of claim 1, wherein the control unit is configured to control operation of the at least one functional unit.

3. The lawn care device of claim 1, wherein the control unit is configured to control operation of a component of the lawn care device based on state information associated with the at least one functional unit.

4. The lawn care device of claim 1, wherein the energy harvester comprises a capacitor or battery to store energy generated responsive to conversion of the source of origin into electrical energy.

5. The lawn care device of claim 1, wherein the energy harvester converts mechanical energy, RF energy, kinetic energy, acoustic energy, or thermal energy into electrical energy.

6. The lawn care device of claim 5, wherein the sensor and the transmitter have no wired connection to the control unit.

7. The lawn care device of claim 5, wherein the energy harvester comprises a microelectromechanical systems (MEMS) device.

8. The lawn care device of claim 5, wherein the energy harvester comprises a piezoelectric crystal.

9. The lawn care device of claim 5, wherein the sensor comprises a safety switch.

10. The lawn care device of claim 5, wherein the sensor comprises a Hall effect sensor.

11. The lawn care device of claim 5, wherein the transmitter comprises a portion of a transceiver configured to enable two-way communication with the control unit.

12. The lawn care device of claim 5, wherein the transmitter comprises a portion of a transceiver configured to enable two-way communication with the control unit, and wherein the transceiver is configured to report data or state change information responsive to a request for the data or state change information by the control unit.

13. The lawn care device of claim 5, wherein the transmitter is configured to provide a signal indicative of data or state change information associated with the functional unit at predefined intervals for wireless transmission to the control unit.

14. The lawn care device of claim 5, wherein the transmitter is configured to provide a signal indicative of state change information associated with the functional unit responsive to a change in state of the functional unit for wireless transmission to the control unit.

15. The lawn care device of claim 5, wherein the lawn care device is a ride on lawn care device or a walk behind lawn care device.

16. A method of utilizing opportunistic energy harvesting on a lawn care device, wherein the lawn care device comprises a transmitter, a sensor, a control unit, a functional unit, and an energy harvester, and wherein the transmitter is operably coupled to the sensor to wirelessly transmit a signal from the sensor to the control unit based on operation of the functional unit, the method comprising:
   converting, by the energy harvester, energy from a source of origin into electrical energy;
   powering, by the energy harvester, the sensor and the transmitter via the electrical energy converted by the energy harvester;
   monitoring, by the sensor, parametric data or state change status to determine whether a state change or data generation has occurred; and
   wirelessly transmitting, by the transmitter, a signal indicative of the state change or the generated data based on whether the state change or data generation has occurred.

17. The method of claim 16, wherein the wirelessly transmitting further comprises transmitting the signal in response to determining that the state change or data generation has occurred.

18. The method of claim 16, further comprising:
   in response to determining that no state change or data generation has occurred and in response to a request for information indicative of current data or current state, wirelessly transmitting a signal indicative of the current data or current state.

19. The method of claim 16, wherein the wirelessly transmitting further comprises transmitting the signal in response to determining that a predetermined report interval is reached.

20. The method of claim 19, wherein the transmitting the signal in response to determining that a predetermined report interval is reached further comprises transmitting the signal in response to a further determination that no request for information is received and no indication of a state change or data generation is received.

* * * * *